Figure 1:
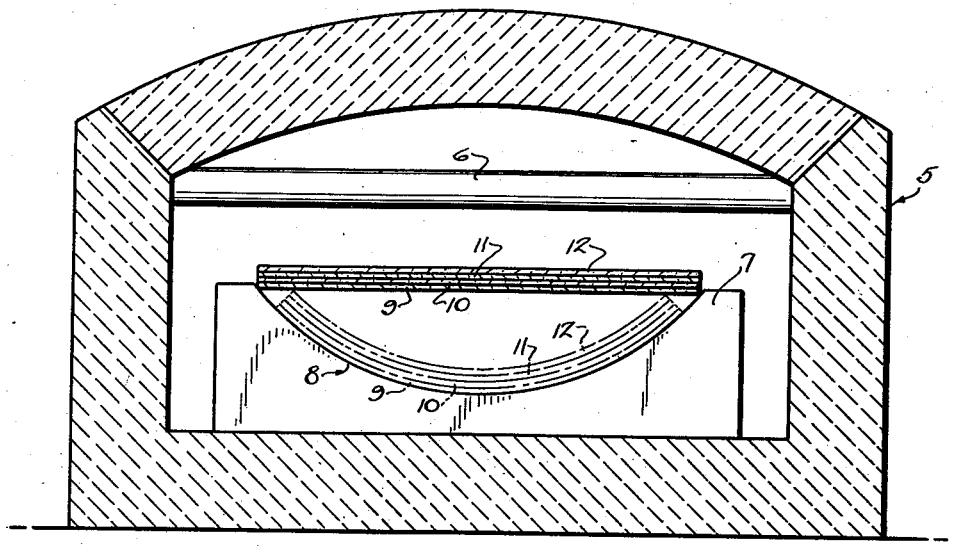

March 23, 1943.  C. F. BINKERT  2,314,325

METHOD OF PRODUCING BENT LAMINATED SAFETY GLASS

Filed Jan. 24, 1942

Inventor
CARL F. BINKERT
By Frank Fraser
Attorney

Patented Mar. 23, 1943

2,314,325

UNITED STATES PATENT OFFICE 2,314,325

METHOD OF PRODUCING BENT LAMINATED SAFETY GLASS

Carl F. Binkert, Toledo, Ohio, assignor to Libbey-Owens-Ford Glass Company, Toledo, Ohio, a corporation of Ohio Application January 24, 1942, Serial No. 428,091

2 Claims. (Cl. 49—79)

The present invention relates broadly to the manufacture of laminated safety glass and more particularly to an improved method of producing bent or curved safety glass.

Laminated safety glass ordinarily comprises two sheets of glass and an interposed layer of thermoplastic adherent thereto to provide a composite structure. One growing field of use for safety glass is in the glazing of openings in airplanes and other aircraft. Safety glass used in such installations ordinarily comprises a relatively thick plastic interlayer which has the advantage of increasing the resistance of the glass to shock as well as facilitating the mounting of the safety glass structure where the thick plastic interlayer extends beyond the edges of the glass sheets to provide a flexible attaching flange. By way of example only, it has been proposed to laminate two sheets of one-eighth inch plate glass with a plastic interlayer also of one-eighth inch thickness.

Much of the safety glass used in airplanes is bent or curved, and in order to properly bend the glass sheets so that they will accurately fit one another when subsequently bonded to the plastic interlayer, it has been customary to interpose between the two glass sheets during bending a spacer having substantially the same thickness as the layer of plastic with which the glass sheets are to be subsequently bonded. This spacer has heretofore frequently consisted of a third sheet or light of glass which has been discarded after the bending operation.

It is the aim of this invention to provide an improved method of bending glass sheets whereby all of the said sheets may be used in the manufacture of laminated safety glass. This not only eliminates the use of a separate spacer sheet but also the waste incident to the use of a glass spacer which is discarded after bending. Briefly, the invention consists in bending four sheets of glass of substantially the same thickness simultaneously, and in then bonding alternate glass sheets with an interposed layer of plastic material of substantially the same thickness of the glass sheets to form a sheet of safety glass. That is to say, the first and third sheets of glass are bonded with one layer of plastic while the second and fourth glass sheets are bounded with a second layer of plastic. Thus, during bending, the second sheet of glass will serve as the spacer for the first and third sheets, while the third glass sheet will act as the spacer for the second and fourth sheets.

Other objects and advantages of the invention will become more apparent during the course of the following description when taken in connection with the accompanying drawing.

Figure 2:
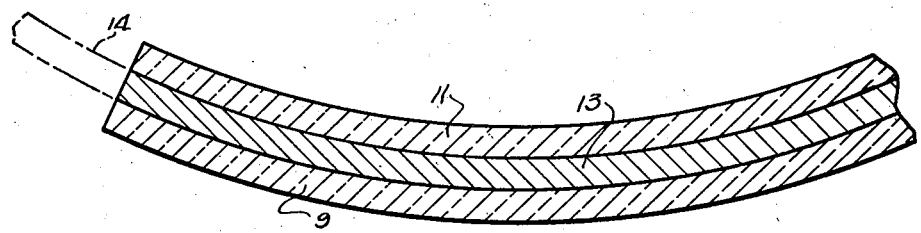

In the drawing wherein like numerals are employed to designate like parts throughout the same:

Fig. 1 is a vertical section through a bending furnace showing the manner of bending the glass sheets in accordance with the invention; and Fig. 2 is a transverse section through a sheet of laminated safety glass.

With reference now to the drawing, the numeral 5 designates any suitable type of bending furnace heated in any desired manner such as by means of the radiant heating tubes 6. Arranged within the furnace 5 is a concave bending mold 7 having its upper shaping surface 8 curved to correspond to the curvature to be given the glass sheets.

In carrying out the invention, four sheets or plates of glass 9, 10, 11 and 12 to be bent, are laid directly one upon the other and supported horizontally upon the mold 7 as shown in full lines in Fig. 1. The four glass sheets are preferably of the same or substantially the same size and thickness. The glass sheets and bending mold are then placed in the furnace and subjected to sufficient heat to cause the said sheets to become softened and to drop or settle down by their own weight into the mold and take the shape thereof as indicated by the broken lines in Fig. 1.

In order to assure that the several glass sheets will not fuse to one another during bending, the inner surfaces of the said sheets may be coated with a suitable material which will prevent adherence therebetween when subjected to bending temperature. For example, the coating may consist of a mixture of whiting and water, baking soda and water, or a water solution of finely divided diatomaceous earth.

As brought out above, in making laminated safety glass a pair of glass sheets is bonded to an interposed layer of thermoplastic material to form a composite structure. Also, that in the glazing of airplanes, it is customary to use a relatively thick plastic interlayer having substantially the same thickness as the glass sheets. Furthermore, that in order to obtain accurate matching of the glass sheets after bending, there is ordinarily interposed between the two sheets of glass a glass spacer sheet of substantially the same thickness as the plastic interlayer.

In accordance with the improved method of bending glass sheets herein provided, all of the said sheets may be used in the manufacture of laminated safety glass, thereby eliminating the use of a separate spacer sheet which is discarded after the bending operation. In other words, all four sheets of glass 9, 10, 11 and 12 are used in making safety glass. More particularly, alternate sheets of glass are adapted to be bonded with an interposed layer of plastic material, while the intervening sheets constitute the spacer sheets during the bending operation. Thus, after bending, the two sheets of glass 9 and 11 are bonded to an interposed layer of thermoplastic 13, as shown in Fig. 2, to form one sheet of safety glass, while the bent glass sheets 10 and 12 are laminated with another layer of plastic to form a second sheet of safety glass. Since the glass sheets are of substantially the same thickness as the plastic interlayers, it will be apparent that during the bending of the four glass sheets, the second sheet 10 will act as the spacer for the glass sheets 9 and 11, while the third sheet 11 will serve as the spacer for the glass sheets 10 and 12.

As pointed out above, the use of relatively thick plastic interlayers is desirable as they not only increase the resistance of the laminated structure to shock and blows, but also facilitate the mounting of the safety glass when the plastic interlayer is extended beyond the edges of the glass sheets to provide a flexible attaching flange 14 as shown in Fig. 2. This form of laminated structure is particularly desirable for use in glazing the openings in airplanes and other aircraft where a flexible type mounting for the glass is preferred.

I claim:

1. The method of producing bent laminated safety glass, which comprises supporting four sheets of glass one upon the other and bending them simultaneously to a predetermined curvature, and then bonding alternate sheets of glass with an interposed layer of plastic material to form a sheet of safety glass.

2. The method of producing bent laminated safety glass, which comprises supporting four sheets of glass of substantially equal thickness one upon the other and bending said sheets simultaneously to a predetermined curvature, and then bonding each two alternate glass sheets with an interposed layer of plastic material of substantially the same thickness as the glass sheets to form a sheet of safety glass.

CARL F. BINKERT.